3,547,572
PASTE AND POWDERS OF ACIDIFIED METAL-
LIZED AZO AND TRIPHENYLMETHANE DYES
HAVING AN AVERAGE PARTICLE SIZE NO
GREATER THAN FIVE MICRONS AND PRO-
DUCTION THEREOF
Françoise Marie Germaine Lunet, Georges Kopp, and
 René Raymond Julien Vittecoq, Seine Maritime, and
 Jacques Pierre Laneres, Armentieres, France, assignors
 to Ugine Kuhlmann, Paris, France
No Drawing. Continuation-in-part of application Ser. No.
 380,079, July 2, 1964. This application Sept. 22, 1969,
 Ser. No. 860,056
Claims priority, application France, July 8, 1963,
940,675
Int. Cl. C09b 45/00
U.S. Cl. 8—42                                    16 Claims

ABSTRACT OF THE DISCLOSURE

The present invention provides aqueous pastes of chrome dyestuffs consisting of water, an anionic dispersing agent, and a dyestuff selected from the group consisting of sulfonated, sulfocarboxylated and polycarboxylated azo chrome dyestuffs, and sulfonated, sulfocarboxylated and polycarboxylated chrome dyestuffs of the triphenylmethane series which dyestuff is water insoluble in cold water in and acid pH region, but is water soluble in hot water, the paste being acidic so that the dyestuff is insoluble in water at room temperature and their particles having an average size not greater than 5 microns.

---

This is a continuation-in-part of application Ser. No. 380,079, filed July 2, 1964, and now abandoned.

The present invention concerns improvements in and relating to new pastes and powders containing metallizable dyestuffs.

The chrome dyestuffs used for dyeing or printing of animal fibres and fibres based on super polyamides are usually first dissolved in the form of their alkali metal salts at a pH generally between 6 and 7, and the solutions obtained are acidified before use. However this method has serious disadvantages. During their solution, the chrome dyestuffs are kept for a relatively long time, and frequently at an elevated temperature, in a neutral neutral or weakly alkaline medium and, by its nature, this medium in many cases causes their partial decomposition, which necessarily results in a loss of yield, the actual loss varying in amount with the character of the dyestuffs. Moreover, whatever precautions may be taken, gels or nonhomogeneous coarse precipitates are very often formed on acidification, which bring about lack of uniformity in shade and form deposits on the fibres, the sides of the dyeing apparatus or the rollers of printing machines. In addition the use of calcareous water makes it difficult to obtain correct applications when working in this way.

New compositions of chrome dyestuffs, obtained by grinding these dyestuffs at a pH below 7 with metallic mordants have been described and the interest which these compositions have in dyeing and printing has been shown. But owing to the very fact that the mordant is previously mixed with the dyestuff, such compositions can only be employed for very precise uses and do not offer much flexibility in application, although such flexibility is very often necessary in practice.

According to the present invention aqueous pastes of metallisable dyestuffs are provided containing essentially water, an anionic dispersing agent and a dyestuff selected from the group consisting of the sulphonated, sulphocarboxylated and polycarboxylated metallisable dyestuffs, the pH of said pastes being so adjusted that the dyestuff is practically in the undissolved state at room temperature and their particles having a size or an average size not greater than 5 microns.

The invention also includes powders of metallisable dyestuffs containing essentially an anionic dispersing agent and a dyestuff selected from the group consisting of the sulphonated, sulpho-carboxylated and polycarboxylated metallisable dyestuffs, the particles of the powder having a size or an average size not greater than 5 microns.

It has been found that the compositions of the present invention containing metallisable dyestuffs have great flexibility of application and yet have the same advantages as the compositions described in the above-mentioned patent application. They can be obtained for example in the following manner:

A suphonated, sulphocarboxylated or polycarboxylated, metallisable dyestuff is ground until particles greater than 5 microns in size have practically completely disappeared, by working in aqueous medium at a pH so regulated that the dyestuff is practically undissolved, in the presence of an anionic dispersing agent and in the absence of a metallic mordant, and if desired, the paste so obtained may be dried to a powder for example by spray drying.

With the pastes or powders thus obtained, dyeing of animal fibres and fibres based on superpolyamides can be carried out by the conventional processes of subsequent chroming or chroming in a single bath (processes known as Monochrome or Metachrome). The pastes or powders may be used in dyeing, even with very calcareous water, for dyeing of fibres, threads, fabrics, or felts, for example by means or bath-circulating apparatus. Thus, for example, it is sufficient to make the products into a paste with cold water; the very fine suspension of dyestuff penetrates great thicknesses of carded wool or bobbins of woolen yarn without difficulty. After uniform distribution of the dyestuff in the bulk fibres to be dyed, the dyestuff may then be fixed by progressive heating and metallized by means of salts of polyvalent metals, of which the most generally used are the salts of trivalent or hexavalent chromium. Even without special precautions, the dyeings thus obtained are generally very uniform.

It has already been proposed to apply to animal and synthetic fibres aqueous dispersions of metallizable azo dyestuffs which are insoluble or sparingly soluble in neutral or acid media, but the dyestuffs used for this process are practically insoluble both in the cold and the hot, while the sulphonated, sulphocarboxylated or polycarboxylated dyestuffs used according to the present invention, if they are insoluble in the cold in a particular pH region, have considerable solubility in the hot, and for this reason, are taken up normally on the fibre.

The following examples, in which the parts are parts by weight, are given without the invention being limited thereto.

EXAMPLE 1

80 parts of Chrome Black TS (Colour Index No. 14,645) in the form of an aqueous paste, are mixed with 19 parts of dinaphthylmethane sodium disulphonate and 1 part of a wetting agent, for example the sodium salt of diheptyl sulphosuccinate. The homogeneous paste is then ground to an average particle fineness (which fineness is determined statistically according to known methods of granulometric analysis) of 2 to 3 microns, then subjected to instantaneous drying by spraying in hot air. The powder obtained mixes readily with cold water, giving a microcrystalline suspension which passes rapidly and without residue through filters of cotton cloth or felt. It enables shrunk wool tops of great thicknesses to be dyed in dyeing machines, using bath-circulation, with substantially perfect results, even in a bath of very calcareous water. The original dyestuff dried at pH 6 is soluble at the rate of more than 50 g. per litre in boiling water. The dispersed dyestuff, dried at pH 4.5, is insoluble in distilled water at 15° C., in which it disperses giving a very fine suspension which is filterable without residue in the cold.

EXAMPLE 2

The 80 parts of Chrome Black TS in Example 1 are replaced by 80 parts of Chrome Blue-Black R (Colour Index No. 15,705). The product obtained behaves like that of Example 1. It dyes bobbins of woollen yarn in a circulation apparatus a dark navy blue, according to the chroming process known as 2 bath chroming. Even when the dyeing is effected in a bath of calcareous water, the dyed wool is fast to rubbing and to the potting test.

EXAMPLE 3

70 parts of Chrome Sky Blue B (Colour Index No. 43,830), in the form of an acid paste insoluble in cold water, are treated in a mixer with 29 parts of the dispersing agent used in Example 1 and 1 part of sodium sulphoricinoleate. The fluid paste is ground until a sample diluted with water leaves no residue on a cotton gabardine sieve. After instantaneous drying, the dyestuff enables dyeing of carded wool rovings to be effected in a circulation apparatus. After treatment with a mixed bath of ammonium chromate and chromium oxalate in dilute formic acid, the rovings are dyed a uniform bright blue throughout the thickness of the rolls.

EXAMPLE 4

60 parts of Fast Chrome Green B (Colour Index No. 26,925) as an acid aqueous paste, are treated in a mixer with 38 parts of sodium lignin sulphonate and 2 parts of sulphated lauryl alcohol. The homogeneous paste is then ground until particles of dimensions greater than 2 microns have disappeared, then instantaneously dried. The dyestuff thus dispersed mixes readily with cold water, and can be used either in dichromate dyeing in two baths, or by the Monochrome process, and also in Vigoureux printing. In these various methods of use it gives on wool a soft green-blue shade, which is very fast to all wet tests.

EXAMPLE 5

75 parts of Fast Chrome Flavin J (Colour Index No. 14,130) as an aqueous paste at pH 3, are made into a paste in a mixer with 23 parts of the dispersing agent of Example 1, and 2 parts of the sodium salt of diheptyl sulphosuccinate, this paste is finely ground and dried in a spray drier. The dyestuff thus dispersed, without previous solution, after simple dispersion in cold water, can be used for dyeing tops, fabrics, threads and felts of wool or other animal fibres, in a bath circulation apparatus. After metallisation for instance with sodium dichromate in the presence of formic acid, the dyes have remarkable fastness to wet tests.

EXAMPLE 6

100 parts of carded wool are charged in a compressed state into a machine for bath circulation dyeing. 6 parts of the dispersed dyestuff of Example 2 are mixed in 50 parts of water of 30° hydrotimetric hardness and the suspension is diluted by the addition of 750 parts of the same water and 2 parts of 100% acetic acid. This dye bath is put in the dyeing machine and circulated for some minutes. It is then heated to boiling over a period of half an hour and kept at the boil for half an hour. The dyebath is totally exhausted and the dyestuff is fixed uniformly over the whole thickness of the card. The latter is immediately treated with 2% of sodium dichromate and 2% of formic acid at 100–101° C. over a period of 45 minutes. The fibre is dyed uniformly a dark navy blue shade which is remarkably fast to wet tests, including potting and acid overdyeing.

With the dyestuffs of the following table one operates as in Examples 1 to 5.

The aqueous pastes containing the dyestuff in the non-dissolved state and the anionic dispersing agent, ground at least until the disappearance of particles greater than 5 microns in size, give on spray-drying in hot air powders which mix easily with water at room temperature. The suspensions thus obtained can be used equally for dichromate dyeing in two baths or in printing or dyeing by foularding. They may be used whether the fibres are threads, tops, felt or wadding.

| Example | Dyestuff | | Shade |
|---|---|---|---|
| | Diazotised base | Coupling component | |
| 7 | 4-sulpho-1-amino-2-naphthol | 5-sulpho-1-naphthol | Blue. |
| 8 | do | 8-sulpho-1-naphthol | Greenish blue. |
| 9 | 4-sulpho-2-amino-phenol | 1,3-dihydroxy-benzene | Bordeaux. |
| 10 | 4-sulpho-6-nitro-2-amino-phenol | do | Bluish Bordeaux. |
| 11 | 6-sulpho-4-chloro-2-amino-phenol | 2,4-dihydroxy-quinoline | Bordeaux. |
| 12 | 6-sulpho-4-nitro-2-amino-phenol | β-Naphthol | Brown. |
| 13 | 6-sulpho-4-nitro-2-amino-phenol | 4-neopentyl-phenol | Do. |
| 14 | 6-sulpho-4-chloro-2-amino-phenol | 8-acetylamino-2-naphthol | Grey. |
| 15 | 6-sulpho-4-nitro-2-amino-phenol | acetylacetaniline | Yellow. |
| 17 | Anthranilic acid | 4'-sulpho-1-phenyl-3-methyl-5-pyrazolone | Do. |
| 18 | 4-phenylaminosulphonyl-1-aminobenzene-2,2'-dicarboxylic acid | 1-phenyl-3-methyl-5-pyrazolone | Do. |
| 19 | 4-sulpho-6-nitro-2-amino-phenol | β-Naphthol | Black. |
| 20 | 4-sulpho-1-amino-2-naphthol | α-Naphthol | Marine. |
| 21 | 6-sulpho-4-chloro-2-amino-phenol | 4-sulpho-1-naphthol | Violet. |
| 22 | 6-sulpho-4-nitro-2-amino-phenol | 1-phenyl-3-methyl-5-pyrazolone | Orange. |
| 23 | 4-nitro-2-amino-phenol | 4'-sulpho-1-phenyl-3-methyl-5-pyrazolone | Do. |
| 24 | 6-chloro-4-nitro-2-amino-phenol | do | Do. |
| 25 | 4-sulpho-6-nitro-2-amino-phenol | 2,4-dihydroxy-quinoline | Red. |
| 26 | 6-nitro-4-methyl-2-amino-phenol | 4'-sulpho-1-phenyl-3-methyl-5-pyrazolone | Red. |
| 27 | 6-sulpho-4-chloro-2-amino-phenol | 3'-sulpho-6'-chloro-1-phenyl-3-methyl-5-pyrazolone | Red. |
| 28 | do | 3'-sulpho-1-phenyl-3-methyl-5-pyrazolone | Red. |
| 29 | 4-sulpho-1-amino-2-naphthol | 1-phenyl-3-methyl-5-pyrazolone | Red. |
| 30 | do | 4'-sulpho-1-phenyl-3-methyl-5-pyrazolone | Red. |
| 31 | 4-nitro-6-chloro-2-amino-phenol | 5-sulpho-1-naphthol | Violet. |

We claim:

1. Aqueous pastes of chrome dyestuffs consisting of water, an anionic dispersing agent, and a dyestuff selected from the group consisting of sulfonated, sulfocarboxylated and polycarboxylated azo chrome dyestuffs, and sulfonated, sulfocarboxylated and polycarboxylated chrome dyestuffs of the triphenylmethane series which dyestuff is water insoluble in cold water in an acid pH region, but is water soluble in hot water, the paste being acidic so that the dyestuff is insoluble in water at room temperature and their particles having a size not greater than 5 microns.

2. Aqueous pastes as claimed in claim 1 in which the dyestuff is an azo dyestuff.

3. Powders of chrome dyestuffs consisting of an anionic dispersing agent and a dyestuff selected from the group consisting of the sulfonated, sulfocarboxylated, and polycarboxylated azo chrome dyestuffs, and the sulfonated, sulfocarboxylated and polycarboxylated chrome dyestuffs of the triphenylmethane series, which dyestuff is water insoluble in cold water in an acid pH region, but is water soluble in hot water, the powders being acidic so that the dyestuff is insoluble at room temperature and their particles having a size not greater than 5 microns.

4. Powders as claimed in claim 3 in which the dyestuff is an azo dyestuff.

5. Process for the preparation of aqueous pastes of chrome dyestuffs which comprises subjecting aqueous pastes of chrome dyestuffs consisting of water, an anionic dispersing agent, and a dyestuff selected from the group consisting of the sulfonated, sulfocarboxylated, and polycarboxylated azo chrome dyestuffs, and the sulfonated, sulfocarboxylated and polycarboxylated chrome dyestuffs of the triphenylmethane series, which dyestuff is water insoluble in cold water in an acid pH region, but is water soluble in hot water, to grinding until particles of size greater than 5 microns have disappeared, the pH being acidic so that the dyestuff is insoluble at room temperature.

6. Process as claimed in claim 5 in which the dyestuff is an azo dyestuff.

7. Process as claimed in claim 5 in which the paste is spray dried.

8. Process as claimed in claim 7 in which the dyestuff is an azo dyestuff.

9. Aqueous pastes of chrome dyestuffs consisting of water, an anionic dispersing agent, and a dyestuff selected from the group consisting of sulfonated, sulfocarboxylated and polycarboxylated azo chrome dyestuffs, and sulfonated, sulfocarboxylated and polycarboxylated chrome dyestuffs of the triphenylmethane series which dyestuff is water insoluble in cold water in an acid pH region, but is water soluble in hot water, the paste being acidic so that the dyestuff is insoluble in water at room temperature and their particles having an average size not greater than 5 microns.

10. Aqueous pastes as claimed in claim 9 in which the dyestuff is an azo dyestuff.

11. Powders of chrome dyestuffs consisting of an anionic dispersing agent and a dyestuff selected from the group consisting of the sulfonated, sulfocarboxylated, and polycarboxylated azo chrome dyestuffs, and the sulfonated, sulfocarboxylated and polycarboxylated chrome dyestuffs of the triphenylmethane series, which dyestuff is water insoluble in cold water in an acid pH region, but is water soluble in hot water, the powders being acidic so that the dyestuff is insoluble at room temperature and their particles having an average size not greater than 5 microns.

12. Powders as claimed in claim 11 in which the dyestuff is an azo dyestuff.

13. Process for the preparation of aqueous pastes of chrome dyestuffs which comprises subjecting aqueous pastes of chrome dyestuffs consisting of water, an anionic dispersing agent, and a dyestuff selected from the group consisting of the sulfonated, sulfocarboxylated and polycarboxylated azo chrome dyestuffs, and the sulfonated, sulfocarboxylated and polycarboxylated chrome dyestuffs of the triphenylmethane series, which dyestuff is water insoluble in cold water in an acid pH region, but is water soluble in hot water, to grinding until particles of an average size greater than 5 microns have disappeared, the pH being acidic so that the dyestuff is insoluble at room temperature.

14. Process as claimed in claim 13 in which the dyestuff is an azo dyestuff.

15. Process as claimed in claim 13 in which the paste is spray dried.

16. Process as claimed in claim 15 in which the dyestuff is an azo dyestuff.

References Cited

UNITED STATES PATENTS

| 2,361,301 | 10/1944 | Libby | 8—79X |
|---|---|---|---|
| 3,120,508 | 2/1964 | Braun | 260—208X |
| 3,419,341 | 12/1968 | Kopp | 8—42 |

FOREIGN PATENTS

| 883,742 | 12/1961 | Great Britain | 8—79 |

DONALD LEVY, Primary Examiner

U.S. Cl. X.R.

8—89, 43, 54, 79, 90, 93, 173; 260—208, 387